(12) United States Patent
Tian

(10) Patent No.: US 11,905,031 B2
(45) Date of Patent: Feb. 20, 2024

(54) METHOD OF MEASURING AIRFLOW VELOCITY USING AN INTEGRATED HEATING AIRSPEED TUBE

(71) Applicant: Shanghai Autoflight Co., Ltd., Shanghai (CN)

(72) Inventor: Yu Tian, Hong Kong SAR (CN)

(73) Assignee: SHANGHAI AUTOFLIGHT CO., LTD., Shanghai (CN)

( * ) Notice: Subject to any disclaimer, the term of this patent is extended or adjusted under 35 U.S.C. 154(b) by 0 days.

(21) Appl. No.: 18/366,678

(22) Filed: Aug. 8, 2023

(65) Prior Publication Data

US 2023/0382554 A1 Nov. 30, 2023

Related U.S. Application Data

(63) Continuation of application No. 17/067,686, filed on Oct. 10, 2020, now Pat. No. 11,780,602.

(30) Foreign Application Priority Data

Oct. 11, 2019 (CN) .......................... 201910963191.4

(51) Int. Cl.
*B64C 39/00* (2023.01)
*B64D 43/02* (2006.01)
*B64D 15/12* (2006.01)
*G01P 5/165* (2006.01)
*B64C 39/02* (2023.01)

(52) U.S. Cl.
CPC ............. *B64D 43/02* (2013.01); *B64D 15/12* (2013.01); *G01P 5/165* (2013.01); *B64C 39/024* (2013.01); *B64U 2201/00* (2023.01)

(58) Field of Classification Search
CPC .... B64D 15/12; B64D 43/02; B64C 2201/14; B64C 39/024
See application file for complete search history.

(56) References Cited

U.S. PATENT DOCUMENTS 2,283,045 A * 5/1942 Carbonara .............. G01P 5/165
  205/73
4,275,603 A * 6/1981 Kalocsay ................ G01P 5/165
  73/182

* cited by examiner

*Primary Examiner* — Jamel E Williams
(74) *Attorney, Agent, or Firm* — WPAT LAW, P.C.; Anthony King

(57) ABSTRACT

A method of measuring airflow velocity using an integrated heating airspeed tube where the integrated heating airspeed tube has a tube body and a heating component. The tube body is provided with a heating cavity, the heating component is located inside the heating cavity, and the heating component and the tube body are integrally formed. The heating component and at least two static pressure air inlet channels are physically separate but overlap in a lengthwise directly within a horizontal portion of the airspeed tube. The tube body integrally forms the static pressure air inlet channel, the dynamic pressure air inlet channel, the heating cavity, the dynamic pressure air inlet hole, and the static pressure air inlet hole as a unitary one-piece structure.

8 Claims, 4 Drawing Sheets

METHOD OF MEASURING AIRFLOW VELOCITY USING AN INTEGRATED HEATING AIRSPEED TUBE

TECHNICAL FIELD

The present invention relates to an integrated heating airspeed tube and an unmanned aerial vehicle including the same.

BACKGROUND

With the continuous development and wider application of unmanned aerial vehicle technology, the airspeed tube on the unmanned aerial vehicle is a tubular device that measures the total pressure and the static pressure of the airflow to determine the airflow velocity, which senses the total pressure and the static pressure of the airflow and sends the measured pressure data to an atmosphere data computer, a flight instrument and other devices. At present, the airspeed tubes of the unmanned aerial vehicle in the existing industry have small air inlet holes, which can easily cause liquid to block the air inlet holes, and cannot meet the conditions of use especially in rainy and snowy weather. At the same time, the airspeed tube in the existing industry has a complicated shape and low transmission accuracy.

SUMMARY

The technical problem to be solved by the present invention is to overcome the shortcomings that the existing airspeed tube is easy to cause liquid blockage and cannot meet the conditions of use, and provides an integrated heating airspeed tube and an unmanned aerial vehicle including the same.

The present invention solves the above technical problems through the following technical solutions:

An integrated heating airspeed tube, comprising a tube body and a heating component, wherein the tube body is provided with a heating cavity, the heating component is located inside the heating cavity, and the heating component and the tube body are integrally formed.

In this solution, the above structural form is adopted, and the heating component is provided in the heating cavity and the tube body is heated, so that the liquid can be vaporized instantly after contacting the tube body. The heating can remove the liquid, effectively preventing liquid from blocking the integrated heating airspeed tube. There will be no liquid blockage phenomenon occurring even if it is used in rainy weather, snowy weather, etc., meeting the using requirements in severe weather, thereby improving the transmission accuracy of the integrated heating airspeed tube.

In addition, through the integrated heating structure design, subsequent assembly between the heating component and the tube body is saved, the assembly cost is saved, the functional reliability is higher, and it is not easy to cause operation failure; the overall appearance of the integrated heating airspeed tube is relatively simple and beautiful.

Preferably, the tube body is further provided with a static pressure air inlet channel and a dynamic pressure air inlet channel that are not communicated with the heating cavity, a dynamic pressure air inlet hole is provided at the end of the tube body, the dynamic pressure air inlet hole is communicated with the dynamic pressure air inlet channel, at least one static pressure air inlet hole is provided on the outer peripheral surface of the tube body, and the static pressure air inlet hole is communicated with the static pressure air inlet channel.

Preferably, the tube body comprises an outer tube and a partition plate, the partition plate is provided in the outer tube and divides the space in the outer tube to form the dynamic pressure air inlet channel, the heating cavity and the two static pressure air inlet channels, the dynamic pressure air inlet hole is located at the end of the outer tube, and the end of the heating cavity is close to the dynamic pressure air inlet hole.

In this solution, the above structural form is adopted, so that the distance between the dynamic pressure air inlet and the heating component is small, thereby effectively enhancing the heating and vaporizing effect of the liquid on the dynamic pressure air inlet hole, and further improving the stability and reliability of the integrated heating airspeed tube. At the same time, the structure is simple, and the overall appearance is simple and beautiful.

Preferably, the tube body further comprises a dynamic pressure tube interface and a static pressure tube interface, the dynamic pressure tube interface and the static pressure tube interface are both connected to the outer tube and are communicated with the dynamic pressure air inlet channel and the static pressure air inlet channel, respectively.

In this solution, the above structural form is adopted, and the dynamic pressure tube interface and the static pressure tube interface are connected to the outside, and the connection is convenient.

Preferably, the dynamic pressure tube interface, the static pressure tube interface, the outer tube and the partition plate are integrally formed.

In this solution, the above structural form is adopted, so that it is very convenient to process and manufacture the tube body, and the structural connection strength is high, which further improves the stability and reliability of the integrated heating airspeed tube.

Preferably, the heating cavity is located at the bottom end of the dynamic pressure air inlet channel, the two static pressure air inlet channels are located at both sides of the dynamic pressure air inlet channel, respectively, the number of the static pressure air inlet holes is four, and every two of the static pressure air inlet holes are communicated with one static pressure air inlet channel.

Preferably, the bottom end of the tube body is provided with a drain hole, and the drain hole is communicated with the dynamic pressure air inlet channel.

In this solution, the above structural form is adopted, and the drainage hole has a drainage function, so that the liquid in the dynamic pressure air inlet channel will flow to the bottom of the tube body and be discharged through the drainage hole, ensuring the stability of the integrated heating airspeed tube.

Preferably, the heating component comprises a heating tube and a heating wire, the heating tube is located in the heating cavity and is integrally formed with the tube body, and the heating wire is inserted into the heating cavity and is electrically connected with the heating tube.

Preferably, the tube body has an "L" shape.

An unmanned aerial vehicle is provided, comprising the integrated heating airspeed tube described above.

On the basis of conforming to common knowledge in the field, the above preferred conditions can be combined arbitrarily to obtain preferred examples of the present invention.

The positive and progressive effects of the present invention are as follows

The integrated heating airspeed tube of the present invention and the unmanned aerial vehicle including the same are heated in the tube body through the heating component, so that the heating removes liquid, effectively preventing liquid from blocking the integrated heating airspeed tube, and meeting the using requirements in severe weather. At the same time, the integrated heating structure design is higher in reliability and is not easy to cause operation failure, and saves the assembly cost. The overall appearance is relatively simple and beautiful, and the transmission accuracy is high.

DESCRIPTION OF REFERENCE SIGNS

Figure 1:
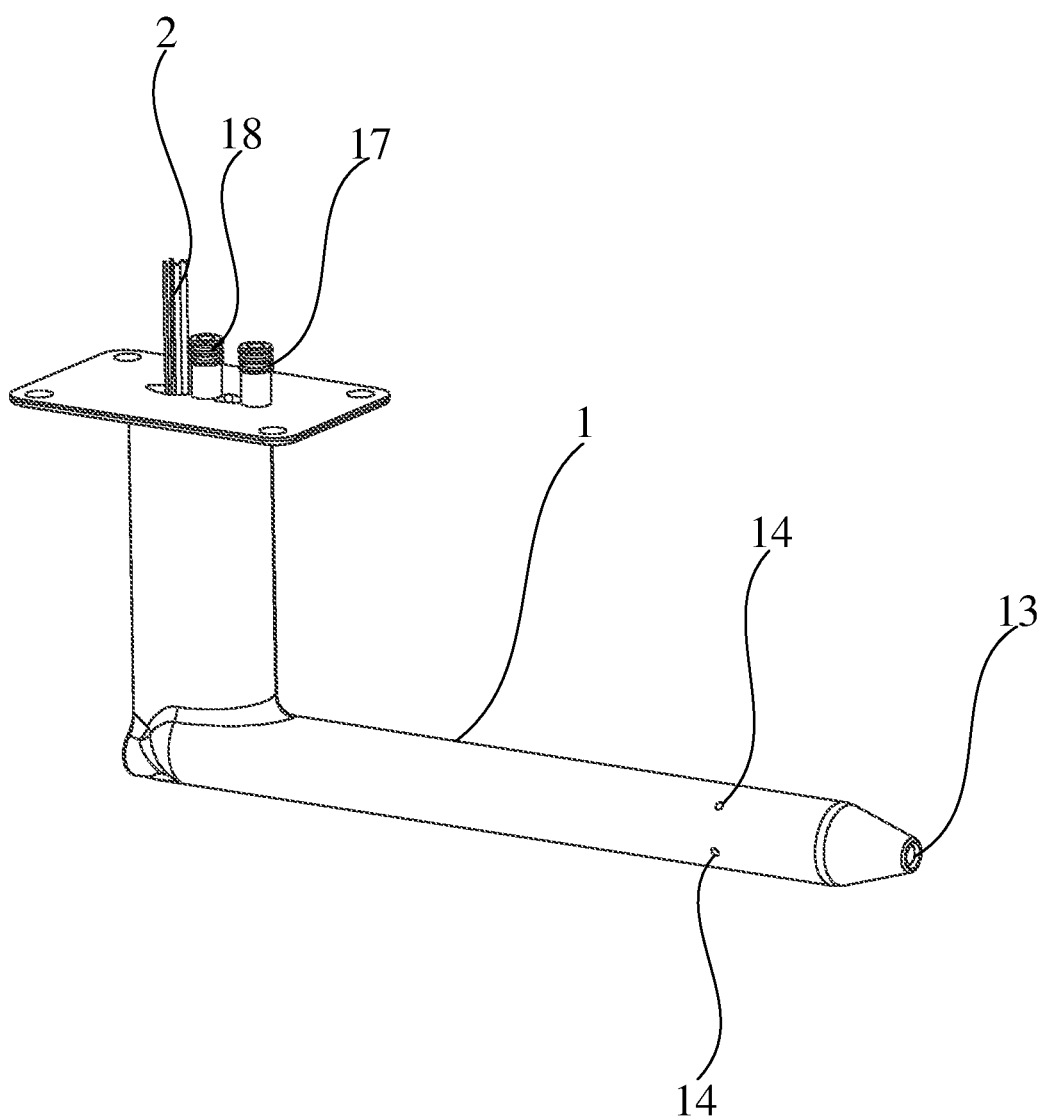
FIG. 1 is a schematic diagram of the structure of an integrated heating airspeed tube according to an embodiment of the present invention.

Tube body 1
Heating cavity 10
Dynamic pressure air inlet channel 11
Static pressure air inlet channel 12
Dynamic pressure air inlet hole 13
Static pressure air inlet hole 14
Outer tube 15
Partition plate 16
Dynamic pressure tube interface 17
Static pressure tube interface 18
Drain hole 19
Heating component 2
Heating tube 21
Heating wire 22

DESCRIPTION OF THE EMBODIMENTS

Hereinafter, the present invention will be explained more clearly and completely by way of embodiments in combination with the drawings, but the present invention is not limited to the scope of the embodiments.

Figure 2:
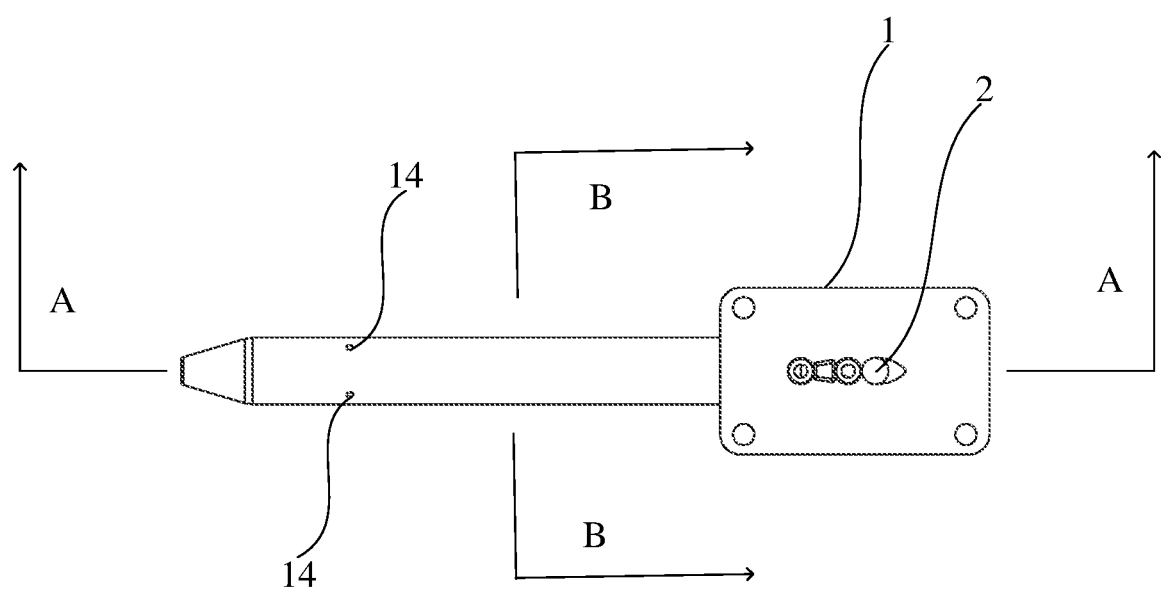
FIG. 2 is another schematic diagram of the structure of an integrated heating airspeed tube according to an embodiment of the present invention.
Figure 3:
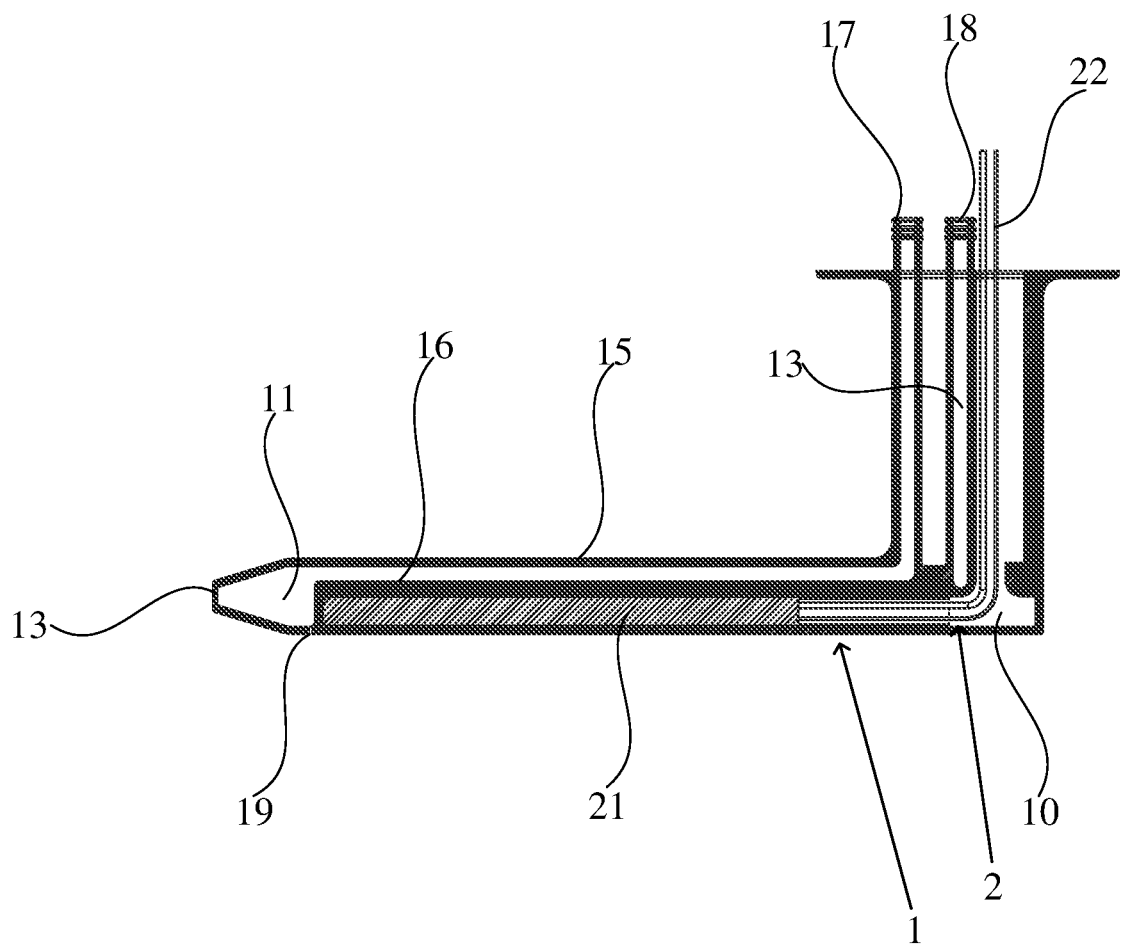
FIG. 3 is a schematic cross-sectional diagram of FIG. 2 along the A-A direction.
Figure 4:
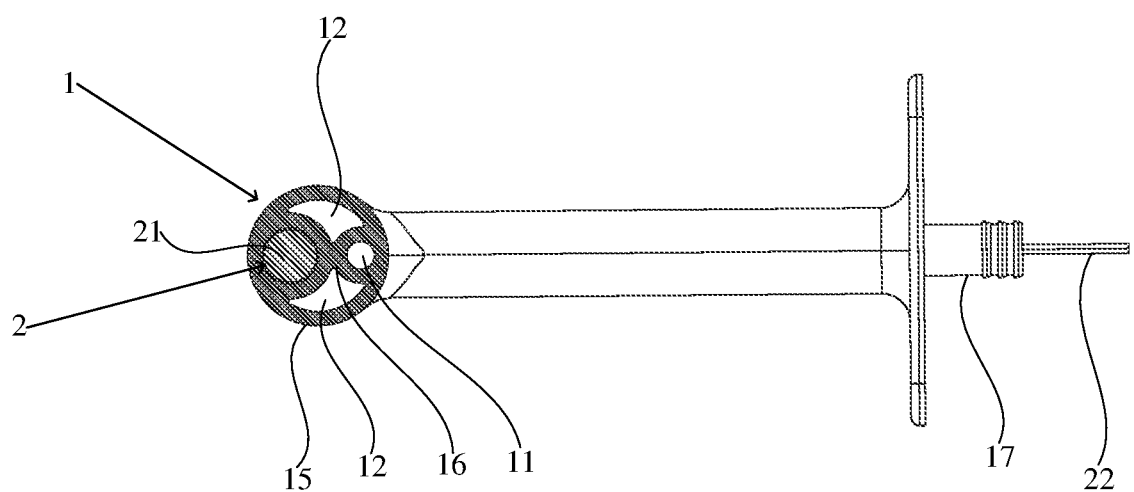
FIG. 4 is a schematic cross-sectional diagram of FIG. 2 along the B-B direction.

As shown in FIG. 1, FIG. 2, FIG. 3 and FIG. 4, the integrated heating airspeed tube according to the embodiment of the present invention comprises a tube body 1 and a heating component 2. The tube body 1 is provided with a heating cavity 10, the heating component 2 is located inside the heating cavity 10, and the heating component 2 and the tube body 1 are integrally formed.

A heating cavity 10 is provided in the tube body 1. The heating component 2 is provided in the heating cavity 10 and the tube body 1 is heated, so that the liquid can be vaporized instantly after contacting the tube body 1. The heating can remove the liquid, effectively preventing liquid from blocking the integrated heating airspeed tube. There will be no liquid blockage phenomenon occurring even if it is used in rainy weather, snowy weather, etc., meeting the using requirements in severe weather, thereby improving the transmission accuracy of the integrated heating airspeed tube. The heating component 2 and the tube body 1 are integrally formed. Through the integrated heating structure design, subsequent assembly between the heating component 2 and the tube body 1 is saved, the assembly cost is saved, the functional reliability is higher, and it is not easy to cause operation failure; at the same time, the heating component 2 is integrally formed and provided in the tube body 1, so that the overall appearance of the integrated heating airspeed tube is relatively simple and beautiful.

The tube body 1 is further provided with a static pressure air inlet channel 12 and a dynamic pressure air inlet channel 11 that are not communicated with the heating cavity 10, a dynamic pressure air inlet hole 13 is provided at the end of the tube body 1, the dynamic pressure air inlet hole 13 is communicated with the dynamic pressure air inlet channel 11, at least one static pressure air inlet hole 14 is provided on the outer peripheral surface of the tube body 1, and the static pressure air inlet hole 14 is communicated with the static pressure air inlet channel 12. The dynamic pressure air inlet hole 13 is provided in the direction of flight, and the static pressure air inlet hole 14 is provided on the outer peripheral surface of the tube body 1. When in use, air will enter the dynamic pressure air inlet channel 11 through the dynamic pressure air inlet hole 13, and enter the static pressure air inlet channel 12 through the static pressure air inlet hole 14, so that the sensor receives and measures the airflow from the dynamic pressure air inlet channel 11 and the static pressure air inlet channel 12, respectively, so as to read the data and realize detection. At the same time, when the liquid comes into contact with the dynamic pressure air inlet hole 13 and the static pressure air inlet hole 14, it will be instantly vaporized due to the heating effect of the heating component 2, effectively avoiding the blockage phenomenon of the dynamic pressure air inlet hole 13 and the static pressure air inlet hole 14, and improving the stability and reliability of the integrated heating airspeed tube.

The tube body 1 comprises an outer tube 15 and a partition plate 16. The partition plate 16 is provided in the outer tube 15 and divides the space in the outer tube 15 to form the dynamic pressure air inlet channel 11, the heating cavity 10 and the two static pressure air inlet channels 12, the dynamic pressure air inlet hole 13 is located at the end of the outer tube 15, and the end of the heating cavity 10 is close to the dynamic pressure air inlet hole 13. The space in the outer tube 15 is divided by the partition plate 16, so that the dynamic pressure air inlet channel 11, the heating cavity 10, and the two static air inlet channels 12 are not communicated with each other, and the overall appearance is simple and beautiful. At the same time, the dynamic pressure air inlet hole 13 is closer to the end of the heating cavity 10, so that the distance between the dynamic pressure air inlet hole 13 and the heating component 2 is small, thereby effectively enhancing the heating and vaporizing effect of the liquid on the dynamic pressure air inlet hole 13, and further improving the stability and reliability of the integrated heating airspeed tube.

The tube body 1 further comprises a dynamic pressure tube interface 17 and a static pressure tube interface 18, and the dynamic pressure tube interface 17 and the static pressure tube interface 18 are both connected to the outer tube 15 and are communicated with the dynamic pressure air inlet channel 11 and the static pressure air inlet channel 12, respectively. The dynamic pressure tube interface 17 and the static pressure tube interface 18 are connected to the outside, and the connection is convenient. The air will enter the dynamic pressure air inlet channel 11 through the dynamic pressure air inlet hole 13, and then the air flow will pass through the dynamic pressure tube interface 17 and be detected. The air will enter the static pressure air inlet channel 12 through the static pressure air inlet hole 14, and then the air flow will pass through the static pressure tube interface 18 and be detected.

The dynamic pressure tube interface 17, the static pressure tube interface 18, the outer tube 15 and the partition plate 16 are integrally formed. Through the integrally formed processing and manufacturing, it is very convenient to process and manufacture the tube body 1, and the structural connection strength is high, which further improves the stability and reliability of the integrated heating airspeed tube.

In this embodiment, the heating cavity 10 is located at the bottom end of the dynamic pressure air inlet channel 11, the two static pressure air inlet channels 12 are located at both sides of the dynamic pressure air inlet channel 11, respectively, the number of the static pressure air inlet holes 14 is four, and every two of the static pressure air inlet holes 14 are communicated with one static pressure air inlet channel 12. The air will flow into the two static pressure air inlet channels 12 through the four static pressure air inlet holes 14, respectively, and the static pressure air flow can be detected through the two static pressure air inlet channels 12. The tube body 1 has an "L" shape. The airflow in the two static pressure air inlet channels 12 will flow together and be detected through the static pressure tube interface 18.

The bottom end of the tube body 1 is provided with a drain hole 19, and the drain hole 19 is communicated with the dynamic pressure air inlet channel 11. The drainage hole 19 has a drainage function, so that the liquid in the dynamic pressure air inlet channel 11 will flow to the bottom of the tube body 1 and be discharged through the drainage hole 19, ensuring the stability of the integrated heating airspeed tube.

The heating component 2 comprises a heating tube 21 and a heating wire 22, the heating tube 21 is located in the heating cavity 10 and is integrally formed with the tube body 1, and the heating wire 22 is inserted into the heating cavity 10 and is electrically connected with the heating tube 21. The heating tube 21 and the tube body 1 are integrally formed. The heating function is more reliable, and it is not easy to cause heating operation failure. The heating wire 22 is electrically connected to the heating tube 21, and the rated voltage is output to the heating tube 21 through the heating wire 22, thereby promoting the heating operation of the heating tube 21.

The embodiment of the present invention further discloses an unmanned aerial vehicle, comprising the integrated heating airspeed tube as described above. The tube body 1 is heated by the heating component 2, so that the liquid is instantly vaporized after contacting the tube body 1. The heating can remove the liquid, effectively preventing liquid from blocking the integrated heating airspeed tube. There will be no liquid blockage phenomenon occurring even if it is used in rainy weather, snowy weather, etc., meeting the using requirements of an unmanned aerial vehicle in severe weather, thereby improving the transmission accuracy of the integrated heating airspeed tube. At the same time, the integrated heating structure design saves the assembly cost, and is higher in functional reliability and is not easy to cause operation failure. The overall appearance of the integrated heating airspeed tube is relatively simple and beautiful.

Although the specific embodiments of the present invention have been described above, those skilled in the art should understand that this is only an example, and the protection scope of the present invention is defined by the appended claims. Those skilled in the art can make various changes or modifications to these embodiments without departing from the principle and essence of the present invention, but these changes and modifications all fall within the protection scope of the present invention.

What is claimed is:

1. A method of measuring an airflow velocity using an integrated heating airspeed tube, said method comprising:
    providing a tube body having a vertical portion and a horizontal portion;
    providing a heating component;
    providing a dynamic pressure air inlet channel disposed within the tube body;
    providing at least two static pressure air inlet channels disposed on both lateral sides of the dynamic pressure air inlet channel within the horizontal portion of the tube body;
    providing a dynamic pressure air inlet hole disposed at a terminal end of the tube body;
    providing at least one static pressure air inlet hole disposed on an outer peripheral surface of the tube body;
    wherein the tube body is provided with a heating cavity;
    wherein the heating component is located inside the heating cavity;
    wherein the heating component and the at least two static pressure air inlet channels are physically separate but overlap in a lengthwise directly within the horizontal portion;
    wherein the tube body integrally forms the static pressure air inlet channel, the dynamic pressure air inlet channel, the heating cavity, the dynamic pressure air inlet hole, and the at least one static pressure air inlet hole as a unitary one-piece structure.

2. The method as recited in claim 1, wherein the static pressure air inlet channel and the dynamic pressure air inlet channel are not in fluid communication with the heating cavity; wherein the dynamic pressure air inlet hole is communicated with the dynamic pressure air inlet channel; and wherein the static pressure air inlet hole is communicated with the static pressure air inlet channel.

3. The method as recited in claim 2, wherein the tube body comprises an outer tube and a partition plate, the partition plate is provided in the outer tube and divides the space in the outer tube to form the dynamic pressure air inlet channel, the heating cavity and the two static pressure air inlet channels, the dynamic pressure air inlet hole is located at a terminal end of the outer tube, and a distal end of the heating cavity is disposed in close proximity to the dynamic pressure air inlet hole.

4. The method as recited in claim 3, wherein the tube body further comprises a dynamic pressure tube interface and a static pressure tube interface, the dynamic pressure tube interface and the static pressure tube interface are both connected to the outer tube and are communicated with the dynamic pressure air inlet channel and the static pressure air inlet channel, respectively.

5. The method as recited in claim 4, wherein the dynamic pressure tube interface, the static pressure tube interface, the outer tube and the partition plate are integrally formed as part of the unitary one-piece structure.

6. The method as recited in claim 3, wherein the heating cavity of the horizontal portion is located below the dynamic pressure air inlet channel.

7. The method as recited in claim 1, wherein the heating component comprises a heating tube and a heating wire, the heating tube is located in the heating cavity, and the heating wire is inserted into the heating cavity and is electrically connected with the heating tube.

8. The method as recited in claim 1, wherein the tube body has an "L" shape.

\* \* \* \* \*